Feb. 13, 1962            H. G. GARTEN            3,021,465
PROTECTIVE RELAY CIRCUITRY FOR HOIST MOTOR CONTROLS
Filed Nov. 8, 1957            3 Sheets-Sheet 1

INVENTOR
HARRY G. GARTEN

BY
ATTORNEY

Feb. 13, 1962 H. G. GARTEN 3,021,465
PROTECTIVE RELAY CIRCUITRY FOR HOIST MOTOR CONTROLS
Filed Nov. 8, 1957 3 Sheets-Sheet 3
OFF POSITION
Fig.3.
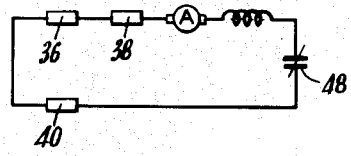
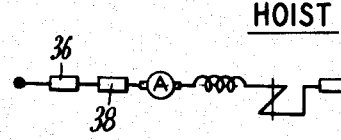
HOIST LOWER
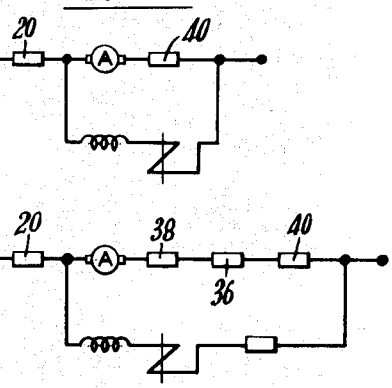
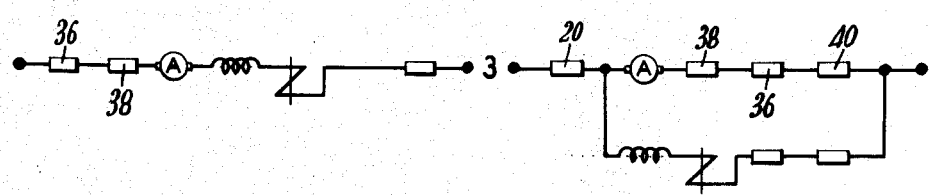
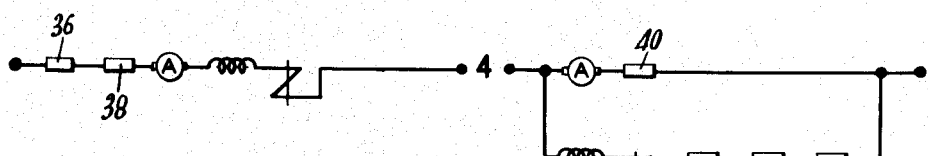
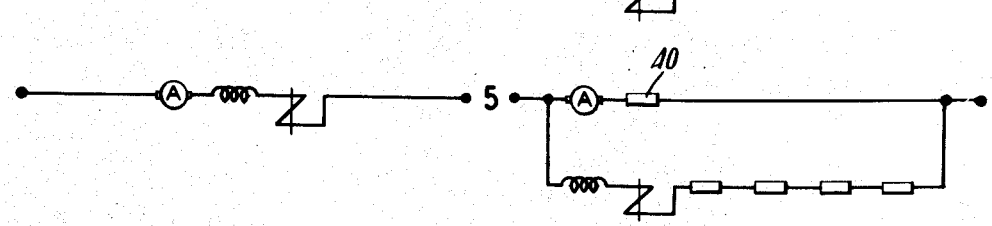
INVENTOR.
HARRY G. GARTEN
BY
ATTORNEY

United States Patent Office 3,021,465
Patented Feb. 13, 1962

3,021,465
PROTECTIVE RELAY CIRCUITRY FOR HOIST MOTOR CONTROLS
Harry G. Garten, Alloy, W. Va., assignor to Union Carbide Corporation, a corporation of New York
Filed Nov. 8, 1957, Ser. No. 695,282
4 Claims. (Cl. 318—247)

This invention relates to a protective circuitry for use with direct current hoist motors and controllers therefor on overhead cranes and the like. More particularly, it relates to a relay circuit which prevents loss of control of the motor during lowering due to a failure in the armature circuit itself or in that portion of the armature circuit which is common to the field circuit.

Industrial power applications require crane hoisting motors which must be able to withstand rigorous extremes of operating conditions. The motors and their associated control circuits must be capable of handling heavy loads while maintaining a high degree of control at all times. In addition, the motors and control circuits are subjected to extremely high currents and often operate in highly corrosive atmospheres both of which adversely affect conductive contact and the control elements themselves and can result in periodic circuit failures.

The type of motor most often employed for operation of the hoisting mechanism of various cranes is the series wound D.C. motor. The series motor is admirably adapted to the purpose because of its inherent characteristic of adjusting its speed inversely with load; this prevents excessive power demands with heavy loads and provides desirable high speeds at light loads.

The circuits employed almost universally for control of D.C. crane motors comprises a series connection for hoisting with various resistors in series that may be incrementally removed to increase the speed of hoisting. The series connection will not work for lowering as an overhauling load would cause the motor to run away. Therefore, by connecting the armature and field in parallel, with resistance in each circuit, characteristics approaching a shunt motor are obtained. With a light load the motor drives the hook down taking a relatively heavy current from the line. When the load is sufficient to overcome the friction of the drive, it begins to overhaul the motor, which then acts as a generator and retards the load by the associated motor effect against the direction of rotation. The speed of lowering may then be changed by varying the resistance in either the series field or the armature circuit to vary this retarding motor effect. While there are many different controls provided by different manufacturers, all operate on the same general principles, i.e., varying series resistance on the hoist cycle to change speed and varying resistance in the field or armature circuits for speed control on the lowering cycle.

It is to be understood that an overhauling load is one which will cause the armature speed, when the motor is operating in the lowering direction, to increase to the point where the generated counter electromotive force exceeds the line voltage and the motor operates as a generator.

For a detailed circuit operation of a dynamic lowering control, reference is made to Chapter 13 of "Control of Electric Motors" by P. B. Harwood, John Wiley & Son, Inc., New York. This description applies to a Cutler-Hammer controller of the same type described hereinbelow for illustrative purposes with the apparatus of this invention.

Most crane hoist equipment contains many standard safety features such as the series magnetic brake which allows the cable drum or armature to turn only when there is power available to operate the motor and release the brake shoe. Also the "off" position on most controllers automatically short circuits the field and armature to give dynamic braking to control the load partially in the event that the magnetic brake should fail. Limit switches to avoid over-hoisting are also well known and operate on obvious principles. Overload relays are also commonly used to open the motor circuit in the event of unusually high currents due to heavy loads. Most equipment utilizing dynamic lowering also has means for limiting the amount of resistance which can be inserted in the field circuit when an overhauling load is being lowered. This limits minimum field strength, and thus limits the maximum lowering speed.

When the crane is lowering with an overhauling load, the motor effect due to the generator action is the only retarding effect on load speed. If an open should occur in the shunt armature circuit, no current can flow, therefore, the braking or retarding force is lost and the load rapidly runs away. In the majority of cases, the operator does not have time to move the controller to the "off" position before the load gains such momentum that the magnetic brake is unable to stop it.

In the past, complicated systems were sometimes used comprising extra trolley rails, brake shoes, commutators, etc. However, these safety devices were often the cause themselves of equipment failure and shutdown. Due to the failure of such attempts, this form of safety protection is not available on most standard controllers. However, experience has taught that in corrosive atmospheres as, for example, metallurgical plants, such failures do occur and can be disastrous to both equipment and personnel in the area.

It is, accordingly, an object of the present invention to provide a protective device for guarding against discontinuities in the shunt armature circuit of direct current crane hoist motors which is simple, rugged and dependable.

It is a further object of the present invention to provide a safety device for use with direct current crane hoist motors utilizing dynamic lowering whereby power is removed from the motor whenever an open circuit condition occurs in the shunt armature circuit during said dynamic lowering.

It is a further object to provide such a safety device for a crane hoist motor operating from a three-wire grounded neutral direct current supply.

It is a still further object of the present invention to provide such a safety device for a crane hoist motor operating from a two-wire direct current source.

Other objects and advantages will be apparent from the following description and drawings in which:

FIG. 3 is a simplified schematic of the actual electrical circuits actuated in the various positions of the controller.

According to the teachings of this invention, a protective device is provided for a direct current hoist motor and controller therefore utilizing dynamic lowering which interrupts the motor power supply in the event of any discontinuity in the shunt armature circuit itself or in that portion of the armature circuit which is common to the field circuit during lowering.

It is to be understood that the subject matter of this invention is intended for use with direct current hoist motors utilizing dynamic lowering. Alternating current motors for this application are either of the simple squirrel-cage type or slip ring induction type and do not develop voltages or polarities suitable to operate such a protective device as disclosed.

The term "shunt armature circuit" as used in the specification and claims refers to the circuit including the armature which shunts the series field, series brake and the associated speed control resistors when the motor is operated in the "lowering" direction.

Figure 1:
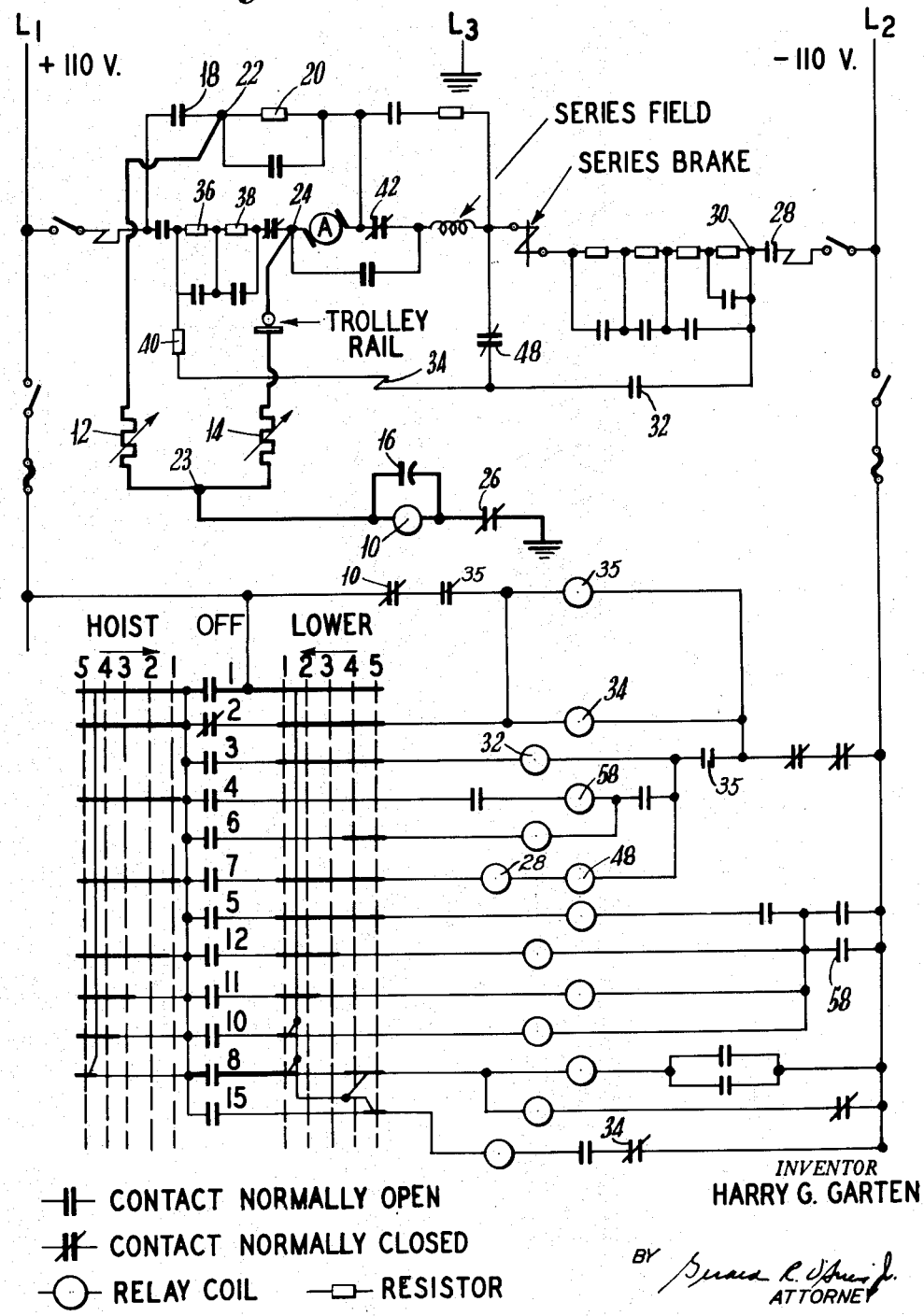
FIG. 1 is a schematic diagram of the protective device applied to a three-wire, neutral grounded, direct current hoist motor control.

Referring more particularly to FIG. 1, the protective device is shown in heavy black lines and comprises a 125 volt direct current relay 10 having a single pole with normally closed contacts, two 0 to 2000 ohm, 200 watt variable resistors 12 and 14, and one 216 to 240 mfd. capacitor 16. A terminal of one resistor is connected between contactor 18 and resistor 20 at point 22; a terminal of the second resistor is connected to the armature terminal at 24 through a trolley rail. The other end of each resistor is connected to one terminal of the protective relay coil 10. The other terminal of the protective relay coil is connected through normally closed contact 26 to ground through the metal structure of the crane. The normally closed contact 26 is an auxiliary contact on contactor 58 and is open whenever the crane is operated in the hoist position which deactivates the protective device. The capacitor 16 is connected across the relay coil and gives a slight delay in the operation of relay 10 in case the contactors 28 and 18 do not close simultaneously. The protective circuit thus formed comprises essentially a bridge circuit in which resistors 12 and 14 are two of the arms. The relay coil 10 which is grounded in conjunction with the ground power supply line L3 comprises the detection circuit. The other two arms are composed of the power sources L1 and L2. Any discontinuity in the shunt armature circuit going through points 30, contactor 32, coil 34, resistors 36, 38 or 40, the limit switch 42 or the armature itself, causes a voltage rise across the detection leg of the circuit containing relay 10 which operates contactor 10 in the hold circuit of the controller. The hold circuit comprises relay coil 35 and its associated contacts one of which deenergizes relay coils 28 and 48 whose contacts respectively remove power from the motor and short the field across the armature. Thus the instant invention almost instantaneously causes the brake to stop the motor before the load can accelerate the motor to the point where the brake is ineffectual to stop it. The resistors 12 and 14 must be adjusted for application to each particular motor and controller with which they are used. They are adjusted for minimum voltage drop from point 23 to ground. It is not necessary that the voltage between their junction point and ground across coil 10 be exactly zero since a considerable voltage rise is necessary to operate said relay.

Figure 2:
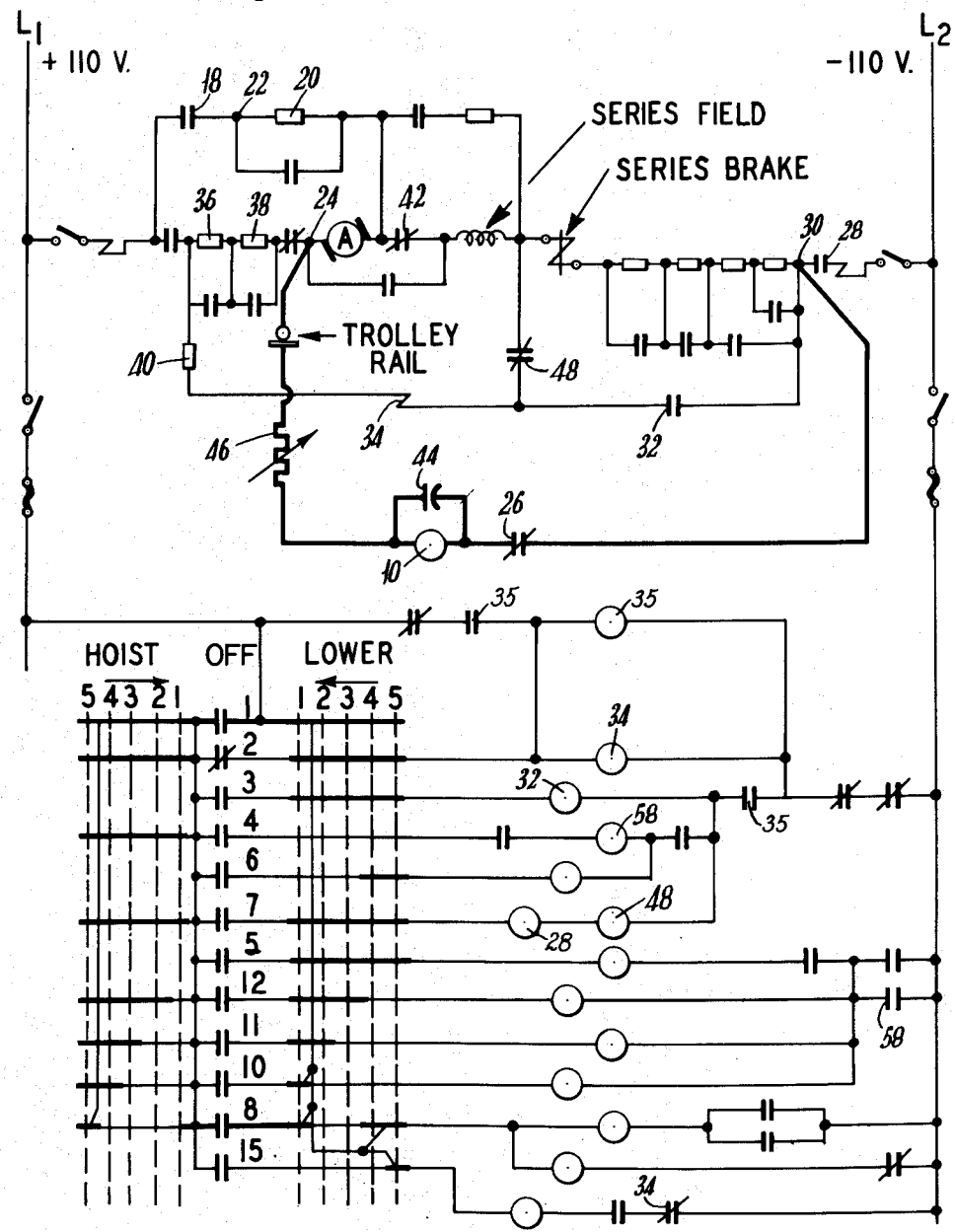
FIG. 2 is a schematic showing the protective device used with a two-wire, direct current, hoist control system.

The protective device shown in FIG. 2 also comprises a 250 volt direct current relay 10 having normally closed contacts, one 0 to 2000 ohm, 200 watt variable resistor 46, one 216 to 240 mfd. capacitor 44, and a normally closed contact 26. Contactor 58 also disconnects the protective device from the circuit during hoisting operation.

In this species of the invention, the protective device is connected directly in parallel with that portion of the shunt armature circuit to be protected. The resistor 46 is adjusted to the maximum value whereby the relay coil 10 would be actuated by any discontinuity in the shunt armature circuit between points 24 and 30 through circuit elements, contactor 32, relay coil 34 and resistors 36, 38 and 40 or limit switch contact 42.

It is of considerable practical importance that this protective relay device is made up of components of such size that they can readily be installed in existing control equipment enclosures as well as being incorporated in new equipment. Nor does it require the installation of additional trolley rails and collector devices for its operation, all of which are particularly susceptible to corrosion and other mechanical failures.

Table I following shows a series of tests conducted with the species of FIG. 1 wherein certain points in the shunt armature circuit and in that portion of the circuit common to both armature and field at A—E. F shows the voltage during a typical plugging operation by moving the controller too rapidly from "lower" to "hoist" positions.

*Table I*

A. Voltage across protective relay while lowering ladle while half-full of slag.

|  | Volts |
|---|---|
| First point | 23.0 |
| Second point | 27.0 |
| Third point | 28.0 |
| Fourth point | 29.0 |
| Fifth point | 26.0 |

B. Voltage across protective relay when armature circuit opened at brushes on fifth point lowering.

180 volts peak—relay operated to trip off power

C. Voltage across protective relay 10 when contactor 34 opened on fifth point lowering.

200 volts peak—relay operated to trip off power

D. Voltage across protective relay when relay resistor circuit opened.

82 volts when opened at 42
115 volts when opened at 20

E. Peak voltage across protective relay operated to trip off power, from fifth point lowering back to "off."

|  | Volts |
|---|---|
| Fifth point | 25.0 |
| Fourth point | 25.0 |
| Third point | 25.0 |
| Second point | 30.0 |
| First point | 30.0 |
| Off position | 0.0 |

F. Peak voltage across protective relay when controller quickly moved from fifth point lowering to first point hoisting.

100 volts—relay operated to trip off power

While this invention has been described with respect to the particular controller as used by Cutler-Hammer, Inc., as described in the previously-mentioned publication, it is to be understood that it would operate equally well with any direct current crane hoist motor utilizing dynamic lowering.

The two species of the protective relay device shown in FIGS. 1 and 2, give protection for discontinuity in the shunt armature circuit per se. However, the protective relay circuit disclosed in FIG. 1 additionally gives protection for an open in the motor armature per se which could be either an opening in the windings or in the commutators and is to be preferred wherever a three-wire system is utilized.

While the invention has been described in a detailed manner with respect to certain embodiments as shown by the drawings, it is to be understood that modifications may be made in the control circuit and that no limitations other than those embodied by the scope of the appended claims are intended.

What is claimed is:

1. A protective device for a direct current hoist motor and motor controller utilizing series operation for hoisting and shunt operation for dynamic lowering and supplied from a three-wire grounded neutral power line whereby protection is afforded in the event of a discontinuity in the armature or in the armature circuit or in the event of plugging, said device comprising a first variable resistor having one terminal connected to the armature side of a main lowering contactor which connects power to the motor on the lowering cycle, a second variable resistor having one terminal connected to the armature terminal most remote from said main lowering contactor, the other terminals of said two resistors being connected to one terminal of a relay coil, the other terminal of said relay coil being connected to ground, said resistors being adjusted to give substantially zero voltage between their junction point and ground, the contactor associated with said relay being normally closed and located in the controller circuit to remove power from the motor when opened, and means coacting with a main hoisting contactor to remove electrical connection from one side of said relay coil during hoisting operations of the motor.

2. A protective device for a direct current hoist motor and controller therefor supplied from a three-wire grounded neutral power line, utilizing series operation for hoisting and shunt operations for dynamic lowering, the armature and field connections being connected, during lowering, through a common circuit to one side of the line and through respective speed control resistances and contactors in the shunt field and armature circuits to the other side of the line, said device comprising a first variable resistor connected on one end to the common power supply circuit on one side of the armature, a second variable resistor having one end connected to the other side of the armature, the other ends of the two variable resistors being connected together, a relay coil connected between the junction point of the two variable resistors and ground and having an associated contact in the controller adapted to remove power from the entire motor when the relay is actuated.

3. A device as set forth in claim 2 including means coacting with a hoisting contactor to remove electrical connection from one side of said relay coil during hoisting operations of the motor wherein the voltage between the junction point of the two variable resistors and ground is adjusted to be substantially zero by setting such variable resistors during periods of normal operation.

4. The device set forth in claim 2 wherein the common circuit supplying the motor field and armature contains a speed control resistor, and the one end of the said first variable resistor is connected to the end of the speed control resistor most remote from the armature.

References Cited in the file of this patent
UNITED STATES PATENTS
2,342,961    Newman _____ Feb. 29, 1944